United States Patent
St. Pierre (10) Patent No.: US 11,330,011 B2
(45) Date of Patent: May 10, 2022

(54) AVOIDANCE OF OVER-MITIGATION DURING AUTOMATED DDOS FILTERING

(71) Applicant: Arbor Networks, Inc., Westford, MA (US)

(72) Inventor: Brian St. Pierre, Acworth, NH (US)

(73) Assignee: Arbor Networks, Inc., Westford, MA (US)

( * ) Notice: Subject to any disclaimer, the term of this patent is extended or adjusted under 35 U.S.C. 154(b) by 154 days.

(21) Appl. No.: 16/800,874

(22) Filed: Feb. 25, 2020

(65) Prior Publication Data
US 2021/0266343 A1    Aug. 26, 2021

(51) Int. Cl.
G06F 21/64     (2013.01)
H04L 29/06     (2006.01)

(52) U.S. Cl.
CPC ...... *H04L 63/1458* (2013.01); *H04L 63/1425* (2013.01)

(58) Field of Classification Search
CPC .......................... H04L 63/1458; H04L 63/1425
See application file for complete search history.

(56) References Cited

U.S. PATENT DOCUMENTS

| | | | | |
|---|---|---|---|---|
| 7,540,025 B2 * | 5/2009 | Tzadikario | .......... | H04L 63/0227 726/22 |
| 10,469,528 B2 | 11/2019 | Bjarnason | | |
| 2006/0098585 A1 * | 5/2006 | Singh | ................. | H04L 63/1416 370/252 |
| 2006/0230167 A1 * | 10/2006 | Watanabe | ............... | H04L 43/00 709/230 |
| 2007/0115850 A1 | 5/2007 | Tsuchiya et al. | | |
| 2007/0180526 A1 | 8/2007 | Copeland | | |
| 2007/0204060 A1 | 8/2007 | Higuchi et al. | | |
| 2011/0242994 A1 | 10/2011 | Carvalho et al. | | |
| 2011/0258511 A1 * | 10/2011 | Mayo | ................ | H03M 13/1515 714/755 |
| 2013/0293391 A1 * | 11/2013 | Osterloh | ................ | G01D 4/002 340/870.03 |
| 2016/0366099 A1 * | 12/2016 | Jordan | ................ | H04L 63/1416 |
| 2017/0250954 A1 * | 8/2017 | Jain | ..................... | H04L 63/1416 |
| 2018/0063187 A1 * | 3/2018 | St. Pierre | ........... | H04L 63/1433 |

(Continued)

*Primary Examiner* — J. Brant Murphy
*Assistant Examiner* — Stephen T Gundry
(74) *Attorney, Agent, or Firm* — Locke Lord LLP; Scott D. Wofsy; Christopher J. Capelli (57) ABSTRACT

A method of detecting patterns for automated filtering of data is provided. The method includes receiving network traffic including bad traffic and good traffic, wherein an attack is known to be applied to the bad traffic, and the good traffic is known to be free of an applied attack. Processing the good and bad traffic includes generating, for each unique packet, each potential unique combination of the packet's fields, storing each combination with associated bad match and good match counters, and incrementing a combination's respective good and bad match counters for each occurrence it matches one of the packets of the respective good and bad traffic. The combinations are sorted based on the good match counter associated with each combination, a number of fields in each combination, and the bad match counter associated with each combination. One or more combination is selected based on results of the sorting for provision to a network traffic filtering component.

13 Claims, 3 Drawing Sheets

(56) References Cited

U.S. PATENT DOCUMENTS

| | | | |
|---|---|---|---|
| 2019/0141061 A1* | 5/2019 | Krishtal | H04L 63/1416 |
| 2019/0230116 A1* | 7/2019 | Compton | H04L 63/1458 |
| 2020/0128040 A1* | 4/2020 | Lazarescu | H04L 63/1425 |
| 2020/0137112 A1* | 4/2020 | Compton | H04L 63/1458 |
| 2020/0259860 A1* | 8/2020 | Adams | H04L 63/1466 |
| 2020/0329054 A1* | 10/2020 | Bjarnason | H04L 63/0263 |
| 2020/0329069 A1* | 10/2020 | Bjarnason | H04L 41/142 |
| 2020/0351244 A1* | 11/2020 | Moore | H04L 61/1511 |
| 2021/0112091 A1* | 4/2021 | Compton | H04L 63/1458 |
| 2021/0120015 A1* | 4/2021 | Rajaram | H04L 63/1425 |
| 2021/0120032 A1* | 4/2021 | St. Pierre | H04L 63/1416 |
| 2021/0144161 A1* | 5/2021 | Mittal | H04L 47/286 |

* cited by examiner

AVOIDANCE OF OVER-MITIGATION DURING AUTOMATED DDOS FILTERING

FIELD OF THE DISCLOSURE

Embodiments of the present disclosure relate generally to methods and systems for malware detection and mitigation, and specifically to avoiding over-mitigation when using automatic filtering of network traffic for Distributed Denial of Service ("DDoS") attacks.

BACKGROUND OF THE DISCLOSURE

Attacks, such as attacks utilizing flooding, denial of service, DDoS, viruses, worms, Trojan horses, rogue applications, malware, exploits, spam, phishing, etc., are becoming an ever-increasing problem in today's Internet. For example, by sending large amounts of malicious packets, denial of service attacks can cause consumption and/or overload of scarce, limited, and/or non-renewable system and/or network resources, such as bandwidth, disk space, CPU time, and/or allocations thereof; destruction and/or alteration of configuration information, such as routing information; disruption of normal operating system functionality; and/or physical destruction and/or alteration of network components, etc.

DDoS attacks may be aimed at different types of services available on a network including, for example, DNS, HTTP (e.g., web traffic), encryption, time services, streaming services, VoIP. DDoS attacks may be aimed at vulnerable corporate services such as, for example, DNS that translates Internet names to addresses. DDoS attacks targeting DNS come in mainly two varieties. One attempts to shut down the DNS system specifically in relation to the target site so that no legitimate user can obtain a valid translation and make a request from that site, such as by altering the operation of the DNS server to provide an invalid translation. Another type of DDoS attack attempts to overload a DNS server directly with a flood of malicious packets that exceeds the capacity of the server, thereby preventing access to all sites whose address translations are dependent thereon.

Automated mitigation techniques have been used to mitigate a DDoS attack, including while the DDoS attack is in progress. However, automated mitigation of a DDoS attack can be prone to over-mitigation in which legitimate traffic is filtered together with malicious traffic.

Conventional methods and systems for automatically mitigating DDoS attacks have generally been considered satisfactory for their intended purpose. However, there is still a need in the art for avoiding over-mitigation when automatically mitigating DDoS attacks.

SUMMARY OF THE DISCLOSURE

The purpose and advantages of the illustrated embodiments will be set forth in and apparent from the description that follows. Additional advantages of the illustrated embodiments will be realized and attained by the devices, systems and methods particularly pointed out in the written description and claims hereof, as well as from the appended drawings.

In accordance with a purpose of the illustrated embodiments, in one aspect, a a computerized method of detecting patterns for automated filtering of data and network monitoring system for performing the method. The method includes receiving network traffic including bad traffic and good traffic, wherein an attack is known to be applied to the bad traffic, and the good traffic is known to be free of an applied attack. Processing the bad traffic includes generating, for each unique packet of the bad traffic, each potential unique combination of fields of the set of one or more fields, storing each of the combinations generated with an associated bad match counter and an associated good match counter, and incrementing the bad match counter associated with each combination for each occurrence that the combination matches one of the packets of the bad traffic. Processing the good traffic includes generating, for each unique packet of the good traffic, each potential unique combination of fields of the set of one or more fields and incrementing the good match counter associated with each combination for each occurrence that the combination matches one of the packets of the good traffic. The method further includes sorting the combinations based on factors including (a) the good match counter associated with each combination, (b) a number of fields in each combination, and (c) the bad match counter associated with each combination, and selecting one or more of the combinations based on results of the sorting for provision to a network traffic filtering component.

In accordance with one or more embodiments, the method can further include comparing the good match count associated with each combination to a threshold value and excluding from the sorting each combination having an associated good match count that exceeds the threshold.

In accordance with one or more embodiments, the set of one or more fields are included in at least one of a header or payload of the associated packet of the good or bad traffic.

In accordance with one or more embodiments, the method can further include filtering network traffic of a network using the network filtering component.

In accordance with one or more embodiments, when sorting the combinations, the factors for sorting the combinations can be applied in the following order: (a) the good match counter associated with each combination, (b) a number of fields in each combination, and (c) the bad match counter associated with each combination.

In accordance with one or more embodiments, the method can further include intercepting the network traffic.

In another aspect of the disclosure, a network monitor is provided for detecting patterns for automated filtering of data. The network monitor includes a memory configured to store instructions and a processor in communication with the memory. The processor, upon execution of the instructions, is configured to perform the method of the disclosure.

In still another aspect of the disclosure, a network monitoring system is provided for intercepting the network traffic and further performing the method of the disclosure.

BRIEF DESCRIPTION OF THE DRAWINGS

The accompanying appendices and/or drawings illustrate various, non-limiting, examples, inventive aspects in accordance with the present disclosure.

DETAILED DESCRIPTION OF CERTAIN EMBODIMENTS

The present disclosure is now described more fully with reference to the accompanying drawings, in which illustrated embodiments of the present disclosure are shown wherein like reference numerals identify like elements. The present disclosure is not limited in any way to the illustrated embodiments as the illustrated embodiments described below are merely exemplary of the disclosure, which can be embodied in various forms, as appreciated by one skilled in the art. Therefore, it is to be understood that any structural and functional details disclosed herein are not to be interpreted as limiting, but merely as a basis for the claims and as a representative for teaching one skilled in the art to variously employ the present disclosure. Furthermore, the terms and phrases used herein are not intended to be limiting but rather to provide an understandable description of the disclosure.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described. It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the embodiments of this disclosure as discussed below can be configured as a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described below. One skilled in the art will appreciate further features and advantages of the disclosure based on the below-described embodiments. Accordingly, the disclosure is not to be limited by what has been particularly shown and described, except as indicated by the appended claims.

In exemplary embodiments, a computer system component may constitute a "module" that is configured and operates to perform certain operations as described herein below. Accordingly, the term "module" should be understood to encompass a tangible entity, be that an entity that is physically constructed, permanently configured (e.g., hardwired) or temporarily configured (e.g. programmed) to operate in a certain manner and to perform certain operations described herein.

It is to be further understood the illustrated embodiments of the present disclosure describe a system, apparatus and method for detecting, avoiding, and/or mitigating the harmful effects of a DDoS attack on a computer system/device or network, while avoiding over-mitigation.

Figure 1:
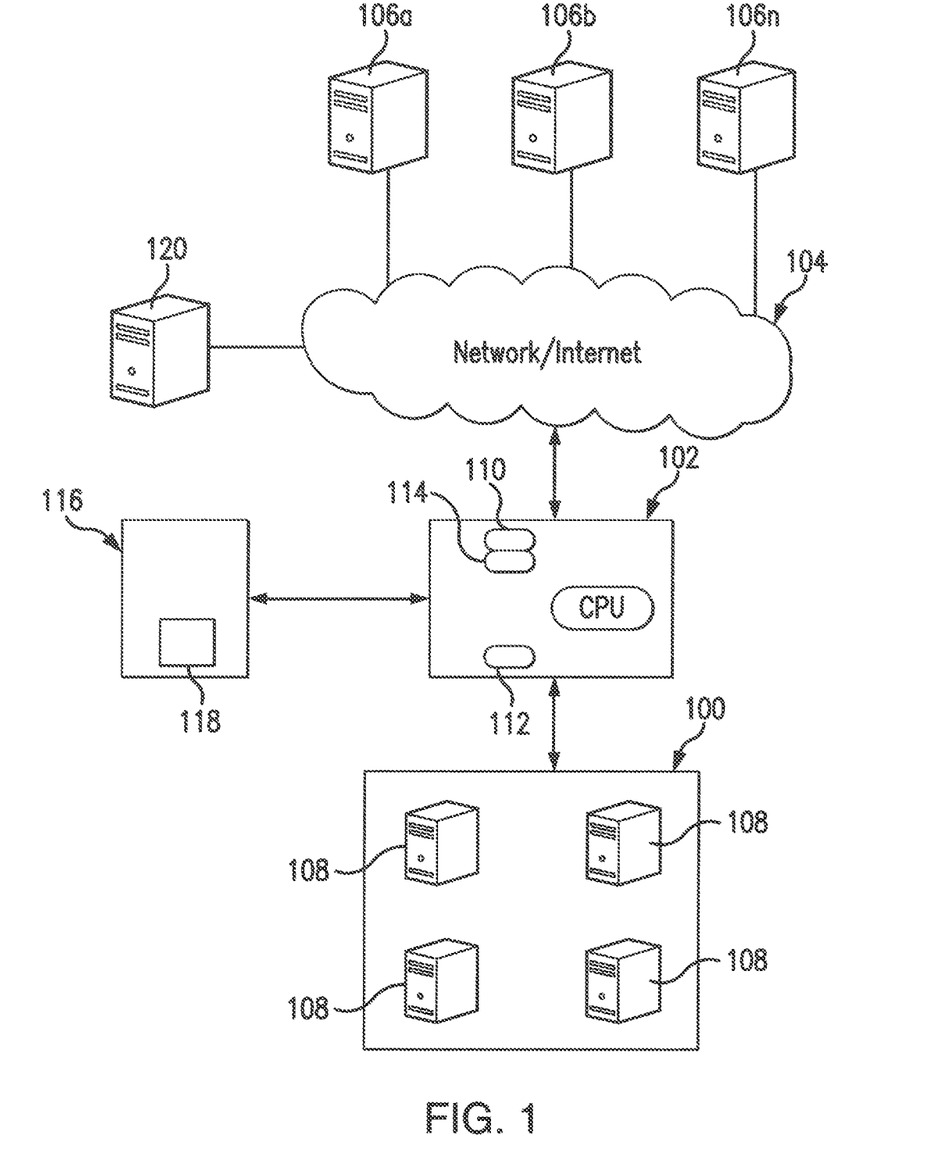
FIG. 1 is a schematic diagram showing network architecture and the relationship between an attack monitor and protected network according to one embodiment of the present disclosure.

Turning now descriptively to the drawings, in which similar reference characters denote similar elements throughout the several views, FIG. 1 illustrates the relationship between a protected network 100, attack monitor 102, Internet 104, and external host devices 106a, 106 b . . . 106 n.

In a typical implementation, the external host devices 106 a, 106 b . . . 106n (also referred to as external devices or host devices) attempt to connect to protected devices 108 within the protected network 100, typically via a private network or a public computer network such as the Internet 104. Examples of external host devices include servers, laptops, desktop computers, tablet devices, mobile phones, mobile computing devices, video games systems, televisions, and other similar devices and systems having Internet connectivity. In one implementation, the attack monitor 102 is a device that authenticates all external host devices 106 a, 106 b . . . 106 n before allowing them to access the protected devices 108 within the protected network 100.

The attack monitor 102 can be configured, for example, similar to devices such as Arbor Edge Defense™ or Arbor Sightline™ by Arbor Networks, Inc. of Westford, Mass. In embodiments, the protected network 100 protected by the attack monitor 102 can be located between the Internet 104 and the protected network 100. In embodiments, the protected network 100 can be an enterprise network, such as a school network, business network, and government network, to list a few non-limiting examples. In other embodiments, the attack monitor 102 is located within the Internet, service provider network, or enterprise network, rather than at the network edge as illustrated. It is to be appreciated that when deployed within the protected network 100, traffic can be diverted to the attack monitor 102.

The attack monitor 102 can include a packet processing system having an external high-speed network interface 110 and a protected high-speed network interface 112. Under current technology, these interfaces are capable of handling 1.0-100 Gbps, for example. The attack monitor 102 may further include processors 114 that can process the packets received at interfaces 110 and 112. Additionally, a central processing unit (CPU), random access memory (RAM), and a storage medium 116 are used to further support the processing of the received packets, and are described in detail below in conjunction with FIG. 3. The storage medium 116 can also store results tables 124 used in the below described pattern detection process as well as other possible information, such as predefined filter rules.

The attack monitor 102 can automatically detect an attack from attacking host 120 using various methods and generate alerts and/or such as by providing information about the detected attack to a mitigation device 130. The mitigation device 130 can include an external attack mitigation device 130 and/or an internal attack mitigation device 130 (as shown in dotted lines) that asserts countermeasures against the detected attack. The countermeasures can include application of a filter using information provided by the attack monitor 102. When the filter is applied, filtered packets can be blocked, redirected, or dropped.

In order to reduce or minimize over-mitigation, attack monitor 102 receives known good traffic and known bad traffic, wherein the term "receive," as used herein refers to reading, receiving a transmission, accessing, or otherwise obtaining. Over-mitigation occurs when legitimate packets are filtered together with attack packets such that both legitimate packets and attack packets are blocked, redirected, or dropped, without distinguishing between legitimate and attack packets. Each packet in the good and bad traffic includes data associated with respective fields of one or more fields. The one or more fields are included in at least one of a header or payload of the associated packet.

One skilled in the art will understand that although referred to as bad traffic, packets included in the bad traffic are a snapshot of network traffic while an attack is underway. Not all of the packets in the bad traffic are malicious and included in the attack itself. Much of the bad traffic can be legitimate packets that are being exchanged while the attack takes place.

The received bad traffic can be network traffic that was streamed and stored or live network traffic that is streaming while the protected network 100 is known to be under attack. The attack can be simulated or can be an actual attack, such as by attacking host 120.

The received bad traffic is analyzed by a first analysis process to generate a set of unique potential combinations. A set of 2n combinations can be formed for a packet having n fields.

The potential combinations can be stored as entries in a combinations table 122 that can be stored, for example, in storage medium 116. Each potential combination entry has an associated bad match counter and an associated good match counter. In one or more embodiments, the potential combinations can be generated during a first pass of the received bad traffic.

The received bad traffic is further analyzed by a second analysis process in which the packets of the bad traffic are compared to the potential combinations and the bad match counter associated with each potential combination's entry is incremented for each occurrence that the potential combination matches one of the packets of the bad traffic. The bad match counter can indicate which data patterns recur in the bad traffic. Those data patterns included in the potential combinations that have a higher associated bad match counter recur more frequently than data patterns associated with potential combinations that have lower or bad match counters.

As stated above, the potential combinations have data patterns that include different numbers of fields. When a potential combination matches a packet of the bad traffic (also referred to as a bad packet), the more fields included in the potential combination, the better the quality of the match.

The second analysis process can be performed in a second pass of the received bad traffic or during the first pass, meaning the same pass as the first analysis process. The first and second passes refer to processing the individual packets of the received bad traffic (e.g., serially or in parallel), until all of the received packets have been processed.

The potential combinations are further analyzed by a third analysis process. In the third analysis process, the attack monitor 102 receives a set of good traffic. For example, a network device could record traffic received from known good hosts, such as hosts that have been authenticated using a username and password with a service on the protected network 108. Recorded traffic can be stored in a variety of formats, including PCAP, NetMon, netttl, RF5, and other industry standard or vendor specific file formats. Furthermore, during the third analysis process the respective potential combinations are compared to the good traffic and the good match counter associated with the respective potential combination entries is incremented for each occurrence that the potential combination being compared matches one of the packets of the good traffic.

The third analysis process can be performed in a third pass after the second pass. In one or more embodiments, the third analysis process can be performed in the same pass as the second pass, such that each potential combination is compared to the good traffic once the potential combination is created. The third pass can include processing each of the individual potential combinations (e.g., serially or in parallel). When comparing, each potential combination is compared to all of the packets of the good traffic.

Alternatively, the third pass can include processing the individual packets of the good traffic, (e.g., serially or in parallel), until all of the packets of the good traffic have been processed. When comparing, each packet of the good traffic is compared to all of the potential combinations, until all of the potential combinations have been processed.

In one or more embodiments, the good match count of each potential combination can be compared to a predetermined threshold value. The potential combination can be excluded from an upcoming sorting operation if the good match count associated with the potential combination exceeds the threshold. In one or more embodiments, the comparison to the threshold is omitted.

Once all of the potential combinations have been generated and processed to determine the good match count and bad match count associated with the potential combination, a sorting process is performed. In the sorting process, the potential combinations (or a product of the potential combinations) are sorted based on a combination of (a) the good match counter associated with the respective potential combinations, (b) a number of fields in the respective potential combinations, and (c) the bad match counter associated with the respective potential combinations. The results of the sorting can be stored, for example in a single results table.

The value of the good match counter associated with a potential combination indicates whether a data pattern represented by the potential combination is likely to be associated with good network traffic that should not be filtered. The higher the good match counter, the more likely the data pattern is associated with good network traffic. The number of fields associated with the potential combination represents the quality of how well the data pattern matches bad packets, and further represents a qualitative strength of the bad match counter associated with the potential combination. The value of the bad match counter associated with the potential combination indicates a quantitative strength of the bad match counter by indicating how many of the bad packets matched the data pattern.

The disclosure is not limited to a particular function or order for sorting based on (a) the good match counter, (b) the number of fields, or (c) the bad match counter. In an example method, the potential combinations are sorted a first time based on the good match counter. The sorted potential combinations are then sorted a second time, so that all combinations that have the same rank after the first sort are then sorted based on the number of fields. The sorted potential combinations are then sorted a third time, so that all combinations that have the same rank after the second sort are then sorted based on the bad match counter.

Once the sorting is performed, the results of the sorting are used to select potential combinations that can be used in a filter, such as a filter used by mitigation device 130 that could be applied to live network traffic. Results of the sorting can include entries stored in results table 124. The results table 124 can be a single table.

The results of the sorting represent or provide a data pattern or logic (e.g., Border Gateway Protocol (BGP) flow specification rules, Openflow™ rules, an Extended Berkeley Packet Filter (BPF) (eBPF) program).

The mitigation device 130 can include a filter that applies the data pattern to drop or redirect packets. The data pattern applied by the filter can be a regular expression, a proprietary expression associated with a proprietary packet matching expression language, an expression used by commercially available expression languages, such as BPF and Wireshark™ display filter.

The mitigation device 130 can be integrated or external from the attack monitor 102, e.g., as a router that applies the BGP flow specification rules or OPenflow rules or as an internal filter.

In one or more embodiments, the first and second analysis processes can be performed using different methods. In a first example method and without limitation to the specific example methods provided, a statistical analysis is used that applies a statistical combination function to packets of the bad traffic. In accordance with the first method, the first analysis process applies a statistical combination function to packets of the bad traffic to generate a collection of potential combinations. The potential combinations are associated with values included in different fields of the packets of the bad traffic.

The second analysis process of the first method includes comparing the received packets of the bad traffic to the potential combinations, which includes comparing character strings of the fields of packets of the received bad traffic to character strings of corresponding fields of the potential combinations. The first method is described in greater detail in U.S. Pat. No. 10,469,528, the entirety of which is incorporated herein by reference.

Advantageously, the attack monitor 102 can perform the analysis either on live or stored network traffic. In either case, the results of such analysis can enable the attack monitor 102 to provide sophisticated attack protection services, such as blocking packets matching the detected patterns in attack traffic, including in an automated fashion without the need for operator intervention.

Since a filter can be prone to over-mitigation, the sorting of entries for potential combinations in combinations table 122 takes into consideration a good match counter that is incremented when the potential combinations for an entry matches a known good packets. Other factors that are used for sorting the potential combinations include the bad match counter associated with the potential combination and the number of fields in the potential combination.

Figure 2:
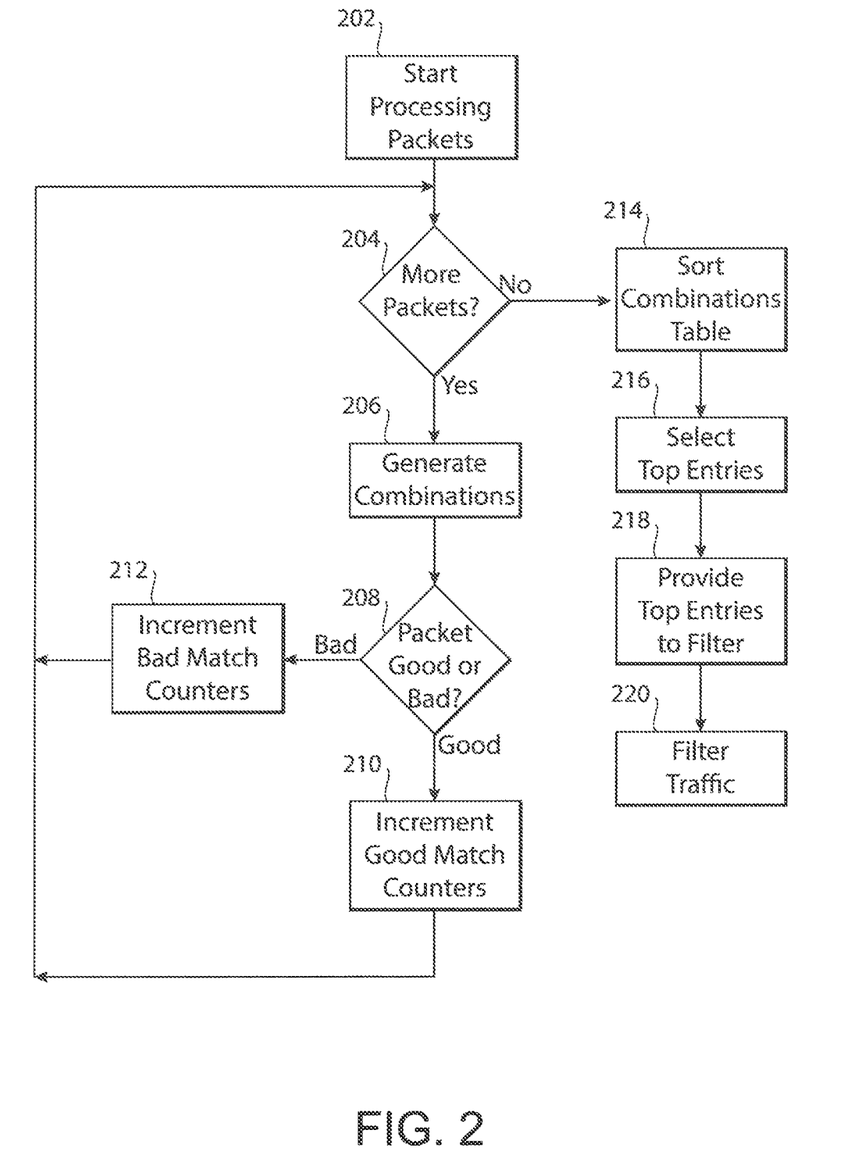
FIG. 2 is a flowchart illustrating a method for automated filtering of data in accordance with the illustrated embodiments.

FIG. 2 shows exemplary and non-limiting flowcharts illustrating methods for mitigating network attacks in accordance with certain illustrated embodiments. The methods can be performed by an attack monitor, such as attack monitor 102. Before turning to description of FIG. 2, it is noted that the flowchart in FIG. 2 shows an example in which operational steps are carried out in a particular order, as indicated by the lines connecting the blocks, but the various steps shown in this diagram can be performed in a different order, or in a different combination or sub-combination. It should be appreciated that in some embodiments some of the steps described below may be combined into a single step. In some embodiments, one or more additional steps may be included. In some embodiments, on or more of the steps can be omitted.

While the embodiments describe the network attack monitor with specific reference to steps directed to detect security and performance issues and/or mitigate detected breaches of a security policy, alternative data analyzing devices may be used, provided they are adapted to apply content-specific logic to processing data packets for providing filters to filter streaming packets or sets of packets.

In an example method, at operation 202, the attack monitor 102 receives and begins processing network traffic in which each packet of the network traffic has been designated as bad or good.

Bad packets are unwanted packets, such as packets associated with an attack or having unwanted information. For example, this network traffic may include a subset (snapshot) of the traffic flow records. In one embodiment, the attack monitor 102 may obtain data that is representative of particular network traffic transmitted over a network during a particular time interval during which it is known that unwanted information was included in the network traffic (e.g., malicious traffic, attack traffic, traffic types that are prohibited by policy, etc.).

Good packets are known to be free of an attack or malicious intent. For example, they may have been sent by a whitelisted sender, or they are part of an authenticated traffic stream, or inspection of their content has shown them to be non-malicious.

The network traffic may be loaded, for example, from a Packet Capture (PCAP) file or some other type of file. In another embodiment, packets flowing through the network may be intercepted from a live data stream and analyzed in real time by the attack monitor 102 to detect whether or not one or more components of the protected network 100 are being attacked and/or to protect the one or more protected components 108 from being overloaded. In some embodiments, functionality of the attack monitor 102 may include selective interception of packets, selective modification of those intercepted packets and the subsequent release/reinsertion of the packets, modified or unmodified, and/or release of new packets, back into the general stream of network traffic.

The packets each include a header and/or a payload with a plurality of fields. The header and/or payload include data associated with each of the fields. Examples of fields include source IP, source port, destination IP, destination port, and one or more payload data fields. Additionally, each packet has a packet length. Packets having a payload can have a payload length.

At operation 204, the process checks to see if any packets remain to be processed. If packets remain, then the next packet is processed at operation 206. For each packet, each potential unique combination of one or more of the fields is generated and stored as an entry in a combinations table, such as combinations table 122 shown in FIG. 1, each entry having an associated good match counter and bad match counter. At operation 208, the packet's good or bad designation is checked.

If the packet was previously designated as good, operation 210 increments the good match counter for each combination that was generated in step 206.

If the packet was previously designated as bad, operation 212 increments the bad match counter for each combination that was generated in step 206.

After incrementing the appropriate counters, processing resumes at operation 204. Processing continues in this way until all packets have been analyzed.

When operation 204 determines that there are no more packets to process, processing continues with step 214, where the entries in the combinations table are sorted based on factors including the good match counter associated with each potential combination, a number of fields in each combination, and the bad match counter associated with each potential combination.

In one or more embodiments, operation 214 includes sorting the entries of the combination table a first time based on the good match counter, sorting the entries of the combination table a second time based on the number of fields, and sorting the entries of the combination table a third time based on the bad match counter.

At operation 216, one or more entries of the sorted combinations table are selected based on a result of the sorting. At operation 218, the selected entries are provided to a network traffic filtering component.

In one or more embodiments, the method includes operation 220. At operation 220, network traffic is filtered by the network traffic filtering component.

The sorted result can be an indication of whether an attack is underway, including which type of attack is underway. The top entries of the sorted combinations table can be provided to the attack mitigation device 130 to be used as a filter that can be applied to network traffic for mitigating the attack. If needed, the entries can be decoded before being provided to the mitigation device 130.

The top entries of the combinations table represent data patterns that occur most frequently in the snapshot subset of network traffic. When an attack is underway, these patterns are most likely to be representative of suspicious traffic and can be used effectively to detect or filter an attack during network operation.

The decoded top entries of the sorted combinations table can be updated and displayed in real time, providing an operator a real time view of current traffic patterns and the ability to view changes in traffic patterns in real time.

In embodiments, the attack monitor 102 can include the attack mitigation device 130 and use the results of the sorting to detect and/or mitigate an attack to generate an alert or apply countermeasures, such as applying a filer that uses the decoded top entries.

The top entries can be indicative of the type of attack. Accordingly, the attack mitigation device 130 can use the information provided by the sorted combinations table and/or its top entries to automatically determine the type of attack and automatically enable countermeasures that are specific to the determined type of attack, and disable countermeasures that are not relevant to the determined type of attack. The advantage provided is avoidance of unneeded countermeasures than can interfere with healthy network traffic.

The information provided by the combinations table and/or its top entries can also be used to select a template to use for applying countermeasures, wherein the template is targeted for the specific type of attack that was detected.

The sorted combinations table results can be compared in real time to results obtained using a sample of healthy network traffic for detection of an attack.

In addition, the results of sorting the combinations table can be used to visualize network traffic activity to obtain information of interest.

Figure 3:
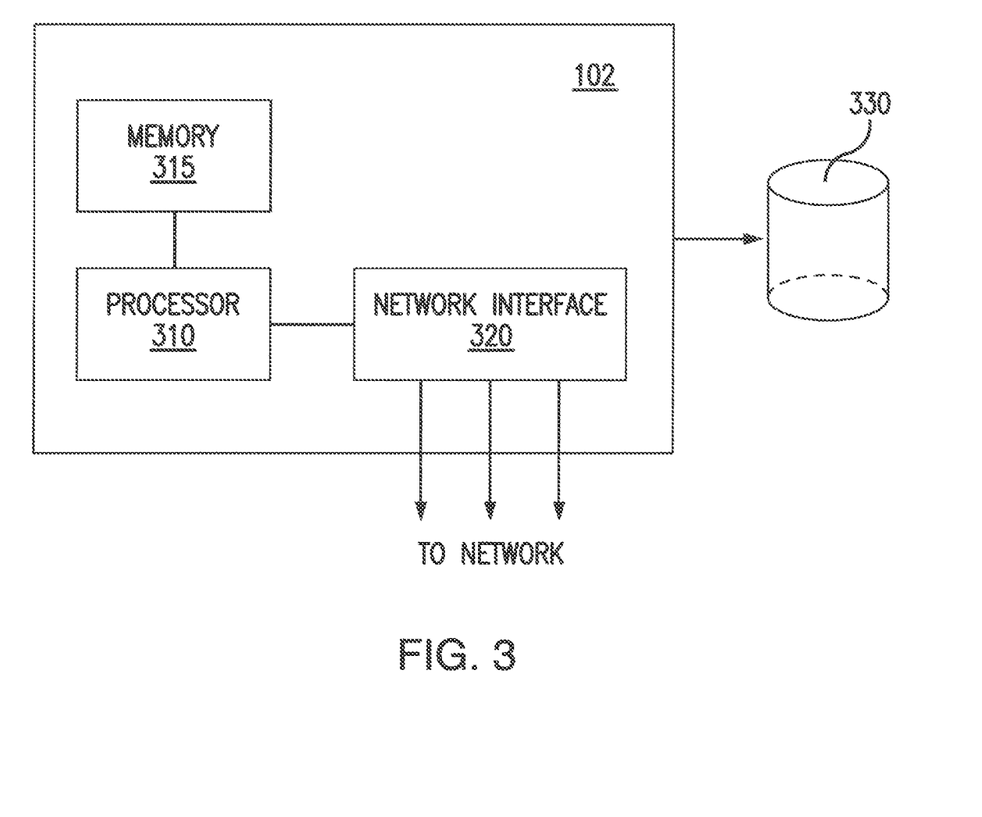
FIG. 3 is a block diagram of the attack monitor of FIG. 1, in accordance with an embodiment of the present disclosure.

With reference now to FIG. 3, illustrated is an exemplary and non-limiting block diagram of the attack monitor 102 constructed according to an illustrated embodiment. The attack monitor 102 is communicatively coupled to the protected network 100 and to a database 330 (which can include storage medium 116 storing the unique combinations table 122 and the results table 124 and/or store network traffic flow information), as shown in FIG. 3, and is at least configured to execute the method for mitigating network attacks as described in greater detail above. The attack monitor 102 can include a processor 310 coupled to a memory 315 and a network-interface module 320. The network-interface module 320 allows the communication with the protected network 100. The processor 310 uses instructions stored in the memory 315 to execute attack detection tasks as well as to control and enable the operation of the network-interface module 320.

Attack mitigation device 130, whether external or internal to the attack monitor 102, includes a processor, memory and network interface, which can be fully or partially shared with the any of the respective processor, 310, memory 315, and network interface 320. The attack mitigation device 130, whether external or internal to the attack monitor 102, can similarly be coupled to the protected network 100 and to the database 330.

The various embodiments of the present disclosure disclose a system and method for automatically detecting recurring data patterns in sample network traffic by analyzing the sample of network traffic known to have bad packets while employing a combination of different analysis procedures/algorithms (e.g., content analysis and statistical analysis). Recurring patterns within the sample network traffic are detected, with repeated occurrences counted by a bad matching count. The analysis procedures includes a comparison of packets of the sample network traffic to packets known to be good packets and counting occurrences in which the packets of the sample network traffic match the good packets by a good matching count. Data patterns are selected to be provided to a network filter device for mitigating unwanted traffic, such as malicious traffic. Detection of the data patterns takes into account the quantity and quality of detection of recurring patterns as well as the quantity of occurrences in which the good packets are matched. Overmitigation by the network filter device can be reduced or minimized by including the good matching count in the determination whether or not to select a data pattern for use with the filter.

The recurring data patterns detected in the sample network traffic are provided to a network filter. The network filter can automatically filter network traffic using the data patterns provided. Detection of the recurring data patterns takes into account known good packets so that during the filtering process mitigation of network traffic can be reduced or minimized.

The various embodiments disclosed herein can be implemented as any combination of hardware, firmware, and software. Moreover, the software can be implemented as an application program tangibly embodied on a program storage unit or computer readable medium. The application program may be uploaded to, and executed by, a machine comprising any suitable architecture. The machine can be implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting patterns configured to be applied for automated filtering of data, the method comprising:
   receiving network traffic including bad traffic and good traffic, wherein an attack is known to be applied to the bad traffic, and the good traffic is known to be free of an applied attack, wherein packets of the network traffic each have data associated with respective fields of a set of one or more fields in a payload of the associated packet;
   processing the bad traffic when the bad traffic is already known to be bad traffic, comprising:
      generating, for each unique packet of the bad traffic, each potential unique combination of fields of the set of one or more fields;
      storing each of the combinations generated with an associated bad match counter and an associated good match counter;
      incrementing the bad match counter associated with each combination for each occurrence that the combination matches one of the packets of the bad traffic;
   processing the good traffic when the good traffic is already known to be good traffic, comprising:
      generating, for each unique packet of the good traffic, each potential unique combination of fields of the set of one or more fields; and
      incrementing the good match counter associated with each combination for each occurrence that the combination matches one of the packets of the good traffic;
   sorting the combinations based on factors including (a) the good match counter associated with each combination, (b) a number of fields in each combination, and (c) the bad match counter associated with each combination; and
   selecting one or more of the combinations based on results of the sorting for provision to a network traffic filtering component.

2. The method of claim 1, further comprising:
   comparing the good match count associated with each combination to a threshold value; and
   excluding from the sorting each combination having an associated good match count that exceeds the threshold.

3. The method of claim 1, further comprising filtering network traffic of a network using the network filtering component.

4. The method of claim 1, wherein, when sorting the combinations, the factors for sorting the combinations are applied in the following order: (a) the good match counter associated with each combination, (b) a number of fields in each combination, and (c) the bad match counter associated with each combination.

5. The method of claim 1, further including intercepting the network traffic.

6. A network monitor for detecting patterns for automated filtering of data, the network monitor comprising:
   a memory configured to store instructions;
   a processor and in communication with the memory, wherein the processor upon execution of the instructions is configured to:
      receive network traffic including bad traffic and good traffic, wherein an attack is known to be applied to the bad traffic, and the good traffic is known to be free of an applied attack, wherein packets of the network traffic each have data associated with respective fields of a set of one or more fields;
      process the bad traffic, comprising:
         generating, for each unique packet of the bad traffic, each potential unique combination of fields of the set of one or more fields;
         storing each of the combinations generated with an associated bad match counter and an associated good match counter;
         incrementing the bad match counter associated with each combination for each occurrence that the combination matches one of the packets of the bad traffic;
      process the good traffic, comprising:
         generating, for each unique packet of the good traffic, each potential unique combination of fields of the set of one or more fields; and
         incrementing the good match counter associated with each combination for each occurrence that the combination matches one of the packets of the good traffic;
      sort the combinations based on factors including (a) the good match counter associated with each combination, (b) a number of fields in each combination, and (c) the bad match counter associated with each combination, wherein, when sorting the combinations, the factors for sorting the combinations are applied in the following order: (a) the good match counter associated with each combination, (b) a number of fields in each combination, and (c) the bad match counter associated with each combination; and
      select one or more of the combinations based on results of the sorting for provision to a network traffic filtering component.

7. The network monitor of claim 6, wherein the processor, upon execution of the instructions, is further configured to:
   compare the good match count associated with each combination to a threshold value; and
   exclude from the sorting each combination having an associated good match count that exceeds the threshold.

8. The network monitor of claim 6, wherein the set of one or more fields are included in at least one of a header or payload of the associated packet of the good or bad traffic.

9. The network monitor of claim 6, wherein the processor, upon execution of the instructions, is further configured to filter network traffic of a network using the network filtering component.

10. A network monitoring system comprising:
   at least one memory configured to store a plurality of programmable instructions; and
   at least one processing device in communication with the at least one memory, wherein the at least one processing device, upon execution of the plurality of programmable instructions is configured to:
      intercept network traffic;
      receive the intercepted network traffic, the network traffic including bad traffic and good traffic, wherein an attack is known to be applied to the bad traffic, and the good traffic is known to be free of an applied attack, wherein packets of the network traffic each have data associated with respective fields of a set of one or more fields in a payload of the associated packet;
      process the bad traffic when the bad traffic is already known to be bad traffic, comprising:
         generating, for each unique packet of the bad traffic, each potential unique combination of fields of the set of one or more fields;
         storing each of the combinations generated with an associated bad match counter and an associated good match counter;
         incrementing the bad match counter associated with each combination for each occurrence that the combination matches one of the packets of the bad traffic;
      process the good traffic when the good traffic is already known to be good traffic, comprising:
         generating, for each unique packet of the good traffic, each potential unique combination of fields of the set of one or more fields; and
         incrementing the good match counter associated with each combination for each occurrence that the combination matches one of the packets of the good traffic;
      sort the combinations based on factors including (a) the good match counter associated with each combination, (b) a number of fields in each combination, and (c) the bad match counter associated with each combination; and
      select one or more of the combinations based on results of the sorting for provision to a network traffic filtering component.

11. The network monitoring system of claim 10, further configured and operable to:
   compare the good match count associated with each combination to a threshold value; and
   exclude from the sorting each combination having an associated good match count that exceeds the threshold.

12. The network monitoring system of claim 10, wherein the processor, upon execution of the instructions, is further configured to filter network traffic of a network using the network filtering component.

13. The network monitoring system of claim 10, wherein, when sorting the combinations, the factors for sorting the combinations are applied in the following order: (a) the good match counter associated with each combination, (b) a number of fields in each combination,
   and (c) the bad match counter associated with each combination.

* * * * *